3,045,040
PRODUCTION OF 2,5-DIARYLAMINO-3,6-DIHY-DROTEREPHTHALIC ACID ESTERS
Werner Deuschel, Ludwigshafen (Rhine), Germany, assignor to Badische Anilin- & Soda-Fabrik Aktiengesellschaft, Ludwigshafen (Rhine), Germany
No Drawing. Filed Sept. 8, 1959, Ser. No. 838,430
Claims priority, application Germany Sept. 10, 1958
11 Claims. (Cl. 260—471)

This invention relates to improvements in the production of 2,5-diarylamino-3,6-dihydroterephthalic acid esters by a process according to which a succinic acid ester is condensed with the aid of an alkali metal alcoholate in an organic solvent to form the di-alkali metal salt of the corresponding succinylosuccinic acid ester, the succinylosuccinic acid ester is set free therefrom by means of substances reacting acid thereto or substances giving off acids, and the free succinylosuccinic acid ester is condensed in the presence of an acid-reacting substance with an arylamino compound to form the corresponding 2,5-diarylamino-3,6-dihydroterephthalic acid ester, which improvements comprise using certain definite organic solvents.

It is known from the literature that 2,5-diarylamino-3,6-dihydroterephthalic acid esters of the general formula:

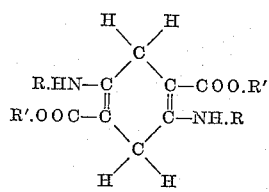

I in which R' represents an alkyl radical and R an aryl radical which may bear substituents, such as hydroxyl groups, halogen atoms, alkoxy groups, carboxylic acid groups, carboxylic acid ester groups and/or carboxylic acid amide groups, can be obtained by condensation of arylamines with succinylosuccinic acid esters in the presence of acid catalysts. It is also known that succinylosuccinic acid esters in turn can be prepared by treating succinic acid esters with metallic sodium, sodium alcoholates or sodamide. The yields seldom exceed 65% of the theory of isolated succinylosuccinic acid esters, even when finely divided sodium is used, the preparation and handling of which in large amounts are both dangerous and troublesome. By using the above-mentioned sodium compounds as condensing agents there are obtained in the ester condensation in general even worse yields, unless the sodium alcoholates are freshly prepared from metallic sodium and the appropriate alcohol in a diluent, for which purpose a prolonged period is necessary.

Alcohols, esters, ethers and hydrocarbons have hitherto been proposed as diluents for the ester condensation. Since in the intermolecular condensation of 2 mols of succinic acid ester 2 mols of alcohol are split off, alcohols are unsuitable diluents for kinetic reasons, although they are capable of dissolving the condensing agent, for example sodium alcoholates. Esters are also capable of dissolving sodium or sodium alcoholates, but they enter into competition with the desired reaction, forming other ketocarboxylic acid esters. While it is true that ethers and hydrocarbons behave inertly, they are not capable of dissolving the condensing agent, for example sodium alcoholates. If good yields are to be achieved in the production of succinylosuccinic acid esters in these solvents, the condensing agent must be present in the finest possible dispersion. This can only be achieved however by their fresh preparation from sodium metal in the said solvents.

The said 2,5-diarylamino-3,6-dihydroterephthalic acid esters are much in demand as intermediates for the production of valuable pigments. It has therefore been desirable to find a simple, safe and readily performable process which, without the disadvantages of the above-mentioned processes, would give the desired diarylamino-dihydroterephthalic acid esters in excellent purity and with good yields. For this purpose it is necessary to carry out the condensation of succinic acid esters to succinylosuccinic acid esters in such a way that it proceeds with great ease and with good yields and that the following reaction can be annexed thereto without trouble.

I have now found that 2,5-diarylamino-3,6-dihydroterephthalic acid esters can be prepared with very good yields in a safer and especially readily controllable way by a process according to which a succinic acid ester is condensed with the aid of an alkali metal alcoholate in an organic solvent to form the di-alkali metal salt of the corresponding succinylosuccinic acid ester, the succinylosuccinic acid ester is set free therefrom by means of substances reacting acid thereto or substances giving off acids, and the free succinylosuccinic acid ester is condensed in the presence of an acid-reacting substance with an arylamino compound to form the corresponding 2,5-diarylamino - 3,6 - dihydroterephthalic acid ester, and wherein at least the condensation of the succinic acid ester with the aid of an alkali metal alcoholate to form the di-alkali metal salt of the corresponding succinylosuccinic acid ester is carried out while using a carboxylic acid dialkylamide as the organic solvent and possibly also the further reactions are carried out in the presence of the same solvent.

In the condensation of the succinic acid esters to succinylosuccinic acid esters, the ratio of succinic acid ester to alkali metal alcoholate should preferably lie between 1:1 and 1:2 mols, best at 1:1.1 mols. Since 2 mols of alcohol are split off during the condensation, there are mainly used as succinic acid esters, esters of succinic acid with cheap alcohols, for example dialkyl esters of succinic acid which are derived from simple alcohols, such as dimethyl succinate, or diethyl succinate. Suitable alkali metal alcoholates are for example the alkali metal alcoholates of low molecular weight aliphatic alcohols, as for example sodium or potassium methylate, ethylate or isopropylate. The alkali metal alcoholate used should be at least partly soluble in the carboxylic acid dialkylamide serving as solvent. It is possible to use an alkali metal alcoholate of a relatively coarse granulation, for example technical sodium methylate or ethylate. The carboxylic acid dialkylamides are preferably used in an amount which is 2.5 to 25 times, mainly 5 to 7 times, that of the weight of the alkali metal alcoholate. Mixtures of different carboxylic acid dialkylamides may also be used. The carboxylic acid dialkylamides should contain the least possible amount of water, should be liquid in the temperature range between 60° and 120° C., and miscible with water. These requirements are satisfied especially well by carboxylic acid dialkylamides containing low molecular weight alkyl groups, which are derived from simple low molecular weight aliphatic carboxylic acids, as for example dimethylformamide, dimethylacetamide, diethylformamide or diethylacetamide, but carboxylic acid dialkylamides of which one alkyl group together with the carboxylic acid radical are members of a common heterocyclic ring, for example N-methylpyrrolidone, N-ethylpyrrolidone or N-methylpiperidone, are also suitable.

The reaction to form the succinylosuccinic acid esters is carried out by slow heating of the reactants in the carboxylic acid dialkylamide or a mixture thereof to temperatures up to 150° C., preferably to 110° to 120° C., at the lowest possible oxygen partial pressure. In general 1 to 4 hours are necessary for this purpose. It is advantageous then to keep the reaction mixture for up to another 10 hours at a temperature between 90° and 120° C., preferably for about 7 hours at 110° C. It has proved to be especially favorable to lead an inert gas, as for example nitrogen, in a weak current over the surface of the reaction mixture or to apply to the reaction vessel a vacuum of 20 to 50 mm. Hg, the alcohol split off by the condensation thereby being distilled off. It is however also possible to heat the succinic acid esters in the carboxylic acid dialkylamides to 50° to 80° C. and to introduce the alkali metal alcoholates at this temperature or to introduce the succinic acid ester into carboxylic acid dialkylamide already containing the alkali metal alcoholate at this temperature and then to heat the reaction mixture further. In most cases the di-alkali metal salts of succinylosuccinic acid esters occur in the form of precipitates which are difficultly soluble in carboxylic acid dialkylamides. They can be separated by filtration by suction from the previously cooled reaction mixture.

Particularly suitable succinic acid esters are the dialkyl esters of succinic acid which are derived from low molecular weight alcohols, as for example dimethyl or diethyl succinate. The alkali metal alcoholates should be derived from the same alcohols whenever the pure esters of the condensation products are to be isolated.

It is especially advantageous when the alkali metal salts of succinylosuccinic acid esters are reacted in the same reaction liquid by the addition of acids or substances supplying acids to form the free succinylosuccinic acid esters and the alkali metal salts. This double reaction may be carried out in carboxylic acid dialkylamides in the absence of water. For this reaction it is preferable to use solid, liquid or gaseous inorganic or organic acids which are as anhydrous as possible, for example boric acid, arylsulfonic acids, aliphatic or aromatic carboxylic acids, hydrogen halides or carbon dioxide, which may be introduced, allowed to flow in or led in. The use of acid salts of polybasic acids is less convenient because these unnecessarily raise the salt content of the reaction liquid. For the said double reaction there may also be used however salts or adducts of the said acids with basic substances which are weaker than alkalies. These basic substances may be different or the same as the arylamines which it is then desired to react with the succinylosuccinic acid esters. If they are different from the arylamines used, they should not react with succinylosuccinic acid esters in their presence. As salts or adducts of the said kind there are suitable, for example, salts of tertiary amines, such as trimethyl ammonium chloride, triethanol ammonium chloride, pyridinium chloride or the adducts of the said acids with carboxylic acid amides, as for example the adducts of hydrogen bromide and acetamide, the adduct of hydrogen chloride and dimethylformamide or the adducts of toluenesulfonic acids with N-methylpyrrolidone.

In carrying out the above-mentioned double reaction, the amount of acid component introduced should be such that it is at least equivalent to the amount of alkali metal alcoholate used. It is especially of advantage to use salts of the above-mentioned acids with arylamino compounds which are subsequently to be condensed with the free succinylosuccinic acid esters, for example salts of these arylamino compounds with hydrogen halides, because these salts are easy to meter as solid substances. The arylamino compounds which are subsequently to be reacted with the free succinylosuccinic acid esters may however also themselves bear acid groups which are capable of entering into a double reaction with the di-alkali metal salts of succinylosuccinic acid esters, as for example aminocarboxylic or -sulfonic acids, such as 1-aminobenzene-2-carboxylic acid or 1-aminobenzene-4-sulfonic acid. The alkali metal salts formed by the double reaction may be soluble or insoluble in the reaction liquid. Since they do not impair the further reaction, it is not necessary to remove them by extraction with water or by filtration. The disengagement of succinylosuccinic acid esters by means of the above-mentioned double reaction may also be carried out at elevated temperature, which should preferably not exceed 150° C.

For the condensation of the free succinylosuccinic acid esters with arylamino compounds to form 2,5-diarylamino-3,6-dihydroterephthalic acid esters, an excess of 0.2 to 10 mols of the arylamino compound is advantageous. Good yields are however only obtained when the excess of arylamino compounds is at least 2 mols. Examples of arylamino compounds are primary aromatic amines derived from benzene or naphthalene and which may in turn bear one or more hydroxyl groups, halogen atoms, alkoxy groups, carboxy groups, carboxylic acid ester groups, carboxylic acid amide groups, sulfhydryl groups and/or sulfonic acid groups. The condensation of succinylosuccinic acid esters with ammonia or amino compounds is catalyzed by acids or other acid-reacting substances. These substances may be used in solid, liquid or gaseous form. They may also be present as salts of amines or of tertiary amino compounds, as adducts, for example of halogen hydracids with carboxylic acid amides, or also in the form of metal salts of polybasic acids. It is sufficient if an amount of 0.005 to 0.05 equivalent of an acid or acid-reacting substance for each mol of succinylosuccinic acid ester is present as catalyst. It is preferable to work by adding, before, during or after the disengagement of the succinylosuccinic acid ester from its dialkali metal salt, the arylamines and the acid catalysts at a temperature of less than 130° C. and to keep the reaction mixture for a period of 30 minutes to up to 4 hours at temperatures between 60° and 130° C., preferably for 1½ hours at 120° C. The diarylaminodihydroterephthalic acid esters thus obtained can be filtered off by suction in crystalline form, if necessary after neutralization of the catalytic amount of acid with alkaline agents, such as alkali metal or alkaline earth metal carbonates, oxides, hydroxides or phosphates or zinc oxide, and after removal of the excess arylamine by distillation under atmospheric or reduced pressure and/or after dilution of the reaction mixture with low molecular weight alcohols and/or water. As a rule it is not possible to separate the 2,5-diarylamino-3,6-dihydroterephthalic acid esters quantitatively from the reaction mixture. The actual content of 2,5-diarylamino-3,6-dihydroterephthalic acid esters in the reaction mixture can however be determined in a simple way without separating the diarylaminodihydroterephthalic acid ester itself from the reaction mixture, for example by conversion into 2,5-diarylaminoterephthalic acid. In this connection it should be remembered that 1 equivalent of 2,5-diarylamino-3,6-dihydroterephthalic acid ester corresponds to 0.98 equivalent of 2,5-diarylaminoterephthalic acid.

The new process is characterized by the facts that it is generally applicable and that the yields obtained therewith are eminently reproducible. It is of special technical interest that the process according to the invention can be safely controlled because it is carried out with alkali metal alcoholates rather than with alkali metals which are difficult to handle, the alkali metal alcoholates being no longer obtained industrially by reaction of alkali metals with alcohols, but by an electrolytic process from alkali metal amalgams. By the new process it is not necessary to separate the 2,5-diarylamino-3,6-dihydroterephthalic acid esters from the reaction mixture, but they may be further worked up as intermediate products in the same carboxylic acid dialkylamides as have already been used as solvents during their production. This advantage of the present process is of extreme interest in the production of 2,5-diarylaminoterephthalic acids because as already known, 2,5-diarylaminoterephthalic acids of the general formula:

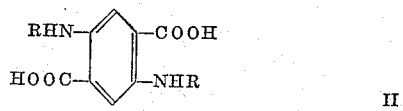

II in which R represents an aryl radical which may contain substituents, such as hydroxyl groups, halogen atoms, alkoxy groups, carboxylic acid groups, carboxylic acid ester groups and/or carboxylic acid amide groups, can be obtained by saponification of the corresponding 2,5-diarylaminoterephthalic acid esters, which in turn are obtainable from the corresponding 2,5-diarylamino-3,6-dihydroterephthalic acid esters by dehydrogenation with the aid of an oxidizing agent, as for example atmospheric oxygen, bromine, iodine or copper nitrate.

For the production of 2,5-diarylaminoterephthalic acids it is therefore more advantageous not to separate the diarylaminodihydroterephthalic acid esters but to dehydrogenate them in the same reaction liquid to the corresponding 2,5-diarylaminoterephthalic acid esters. For this purpose dehydrogenation agents may be added if necessary. Besides, for example, atmospheric oxygen, bromine, iodine or copper nitrate, there have also proved especially suitable for this purpose sulfur or nitroarylsulfonic acids or their salts, such as meta-nitrobenzene sulfonic acid sodium salt. Selenium or selenium dioxide are also suitable as dehydrogenation agents. The dehydrogenation agents are preferably present in the reaction mixture in a 1 to 4 molar amount with reference to the diarylaminodihydroterephthalic acid to be dehydrogenated. The dehydrogenation takes place even at 75° C. but may be carried out also at temperatures between 120° and 150° C. In most cases the dehydrogenation has ended within 2 to 6 hours. Sulfur may be used as the dehydrogenation agent for example in elementary form or also combined as alkali or ammonium sulfides. It is immaterial whether sulfur is introduced or whether polysulfides are produced in the reaction mixture with the aid of sulfur, or whether polysulfides are added to the reaction mixture in solid form or in the form of solutions. Alkali salts of nitroarylsulfonic acids may be added dissolved in diluents, for example in water or in alcohols or glycols or in mixtures of alcohols or glycols with water or in carboxylic acid dialkylamides, for example in dialkyl formamides, or in N-alkyl-pyrrolidones. The salts of nitroarylsulfonic acids may however also be introduced in solid form and the reaction mixture if necessary diluted with the said agents. An addition of alkaline-reacting agents, for example alkali carbonates or alkali hydroxides, such as sodium or potassium carbonate or hydroxide, is not essential in the dehydrogenation. If however it is intended to separate the diarylaminoterephthalic acid ester by filtration by suction, possibly after dilution of the reaction mixture with water, or after distillation of the arylamine at atmospheric or reduced pressure, it is better if no alkaline-reacting agent is present in the reaction mixture.

The presence of alkaline-reacting agents is however of great advantage when the condensation products of succinylosuccinic acid esters with arylamino compounds are to be separated, after their dehydrogenation, in the form of 2,5-diarylaminoterephthalic acids. For this purpose it is necessary to saponify the two ester groups of the diarylaminoterephthalic acid esters obtained. The saponification may be carried out for example in the presence of mineral acids, for example hydrochloric acid or sulfuric acid, or also in the presence of alkaline-reacting agents of the said kind. It is preferable to add to the reaction mixture containing the diarylaminoterephthalic acid, alkali hydroxide, such as sodium or potassium hydroxide, water and if necessary alcohols or glycols, to heat the mixture for 1 to 4 hours at 70° to 150° C., preferably 3 hours at 110° to 120° C., and to precipitate the diarylaminoterephthalic acids from the previously diluted aqueous solutions by the addition of acids. It is usually necessary to free the aqueous solutions by filtration from insoluble constituents prior to the precipitation with acids. If alcohols or glycols are added for the saponification, their amount should in general be half to five times the amount of carboxylic acid dialkylamide originally used. In an alkaline saponification, the amount of alkaline-reacting agent should be such that it is sufficient for the formation of the dialkali salt of the diarylaminoterephthalic acid concerned. If the dehydrogenation of the diarylaminodihydroterephthalic acid esters is carried out in the presence of alkaline-reacting agents of the above-mentioned kind and of water with prolonged heating to boiling, the corresponding 2,5-diarylaminoterephthalic acids are directly obtained.

The low solubility of 2,5-diarylaminoterephthalic acids in aqueous liquid and the simple and certain separation of these compounds from the reaction mixtures thereby occasioned makes it possible, starting from the new process for the production of 2,5-diarylamino-3,6-dihydroterephthalic acid esters, to recover the compounds thereby formed practically completely in the form of the corresponding 2,5-diarylaminoterephthalic acids.

In the manner above explained it is possible to prepare numerous 2,5-diarylaminoterephthalic acids, as a rule with excellent yields, in a simple way. Some of these 2,5-diarylaminoterephthalic acids are listed in the following table with an indication of the aromatic amino compounds from which they are derived, the decomposition points and the yields obtained:

| Aromatic amino compound | 2,5-diarylaminoterephthalic acid therefrom | Decomposition point in ° C. | Yield in percent of the theory |
| --- | --- | --- | --- |
| aniline | violet powder | 330 | 80–85 |
| para-toluidine | ___do___ | 320 | 85 |
| para-anisidine | ___do___ | 320 | 78.5 |
| ortho-chloraniline | red-violet powder | 350 | 72 |
| para-chloraniline | red powder | 320 | 88 |
| 2,4-dichloraniline | Bordeaux red powder | 370 | 67.5 |
| 3,5-dichloraniline | violet powder | 340 | 56 |
| 3,4-dichloraniline | red powder | 340 | 60 |
| ortho-aminobenzoic acid | red-brown powder | 360 | 53 |
| meta-aminobenzoic acid | red powder | 340 | 78 |
| para-aminobenzoic acid | brown powder | 400 | 40 |
| alpha-naphthylamine | blue-violet powder | 350 | 35 |

The following examples will further illustrate this invention but the invention is not restricted to these examples. The parts and percentages specified are by weight.

EXAMPLE 1

A suspension of 15.25 parts of technical sodium methylate in 100 parts of N-methylpyrrolidone is stirred into 43.7 parts of diethyl succinate, the air above the mixture is expelled by leading dry nitrogen therever, and the reaction mixture is heated within 2½ hours to 110° C. The reaction mixture is kept at this temperature for 7 hours. (The vapors thereby escaping can be condensed by strong cooling, about 12 parts of condensate being obtained which however can be thrown away.) Into the reaction solution, without cooling, there are then introduced 55.5 parts of aniline and 36.5 parts of aniline hydrochloride. The mixture is then stirred for 1½ hours while leading dry nitrogen thereover at 120° C., and the escaping vapors may again be condensed. (The 3 to 5 parts of condensate thereby obtained may also be thrown away.) Then 15 parts of water are added in small portions to the reaction mixture at 50° C., the deposited reaction material is allowed to cool and then filtered off by suction. It is washed with cold methanol and water and dried. There are thus obtained 38.5 parts of 2,5-dianilino-3,6-dihydroterephthalic acid ester in the form of salmon colored crystals of the melting point 188° to 191° C.

The following procedure may also be followed for the separation of the 2,5-dianilino-3,6-dihydroterephthalic acid ester from the reaction mixture:

The excess acid present in the reaction mixture is first neutralized by adding 1 part of sodium bicarbonate or an aqueous solution containing 1 part of sodium bicarbonate and then the aniline not used up in the reaction is distilled off under atmospheric or reduced pressure. After the distillation residue has cooled off the dihydro ester crystallizes out and can be worked up as above described.

The reaction mixture, as may be shown by conversion of the dihydro ester into 2,5-dianilinoterephthalic acid, contains however not merely 38.5 parts, but 42.5 parts of 2,5-dianilino-3,6-dihydroterephthalic acid ester. For the conversion of the 2,5-dianilino-3,6-dihydroterephthalic acid ester into the corresponding terephthalic acid, the hot solution of the dihydro ester in the above-mentioned reaction mixture containing N-methylpyrrolidone is especially suitable. The 2,5-dianilino-3,6-dihydroterephthalic acid ester present in the reaction mixture can therefore be converted, without separating it, into 2,5-dianilinoterephthalic acid as follows:

To the reaction mixture there are added, without cooling, 62.5 parts of meta-nitrobenzenesulfonic acid sodium salt and 110 parts of a solution of 25 parts of sodium hydroxide in 85 parts of water and the whole is stirred thereafter for 3 hours at 110° C. Then 125 parts of water are allowed to flow into the reaction mixture and the whole is heated to boiling under reflux for 2 hours. The reaction mixture is then diluted with 2,500 parts of water, filtered free from deposited impurities and such an amount of a mineral acid, for example aqueous hydrochloric acid or sulfuric acid, is added that the pH of the filtrate amounts to 3.5. The reaction material is precipitated in the form of a violet deposit which is filtered off by suction, carefully washed with water and dried. 36 parts of 2,5-dianilinoterephthalic acid are obtained as a violet powder which decomposes at about 330° C. Analysis of the compound gives the following values:

Calculated: C, 68.94%; H, 4.63%; O, 18.39%; N, 8.04%. Found: C, 68.88%; H, 4.90%; O, 18.3%; N, 7.82%.

EXAMPLE 2

If dimethylformamide be used as solvent instead of N-methylpyrrolidone and the procedure of Example 1 is otherwise followed, a reaction mixture is obtained of which the content of 2,5-dianilino-3,6-dihydroterephthalic acid ester corresponds to 27.5 parts of 2,5-dianilinoterephthalic acid.

EXAMPLE 3

If the aniline in Example 1 be replaced by the corresponding amounts of the amines specified in the following tables, and the aniline hydrochloride by the corresponding amounts of the hydrochlorides of the amines in question, the corresponding 2,5-diarylamino-3,6-dihydroterephthalic acid esters are obtained in the amounts given in Table I or in amounts which are equivalent to the amounts of the corresponding 2,5-diarylaminoterephthalic acids given in Table II:

Table I

| Aromatic amino compound | 2,5-diarylamino-3,6-dihydroterephthalic acid ester | Amount (in parts) obtained |
|---|---|---|
| para-toluidine | pale orange crystals | 42.5 |
| para-chloraniline | orange crystals | 45 |
| 2,5-dichloraniline | yellow crystals | 43.5 |
| 3,4-dichloraniline | orange crystals | 47 |
| alpha-naphthylamine | do | 49.5 |

Table II

| Aromatic amino compound | Equivalent amount (in parts) of 2,5-diarylaminoterephthalic acid |
|---|---|
| para-toluidine | 40 |
| para-anisidine | 40 |
| ortho-chloraniline | 41 |
| para-chloraniline | 46 |
| 2,4-dichloraniline | 41 |

EXAMPLE 4

A mixture of 15.15 parts of sodium methylate and 43.75 parts of diethyl succinate is heated in a nitrogen atmosphere in 100 parts of N-methylpyrrolidone within 3 hours to 100° C. 100 parts of aniline are allowed to flow in slowly at this temperature, the whole is heated to 110° C. and kept at this temperature for 6 hours while leading a current of nitrogen thereover as in Example 1. Then 36 parts of aniline hydrochloride are added and the further procedure of Example 1 is followed. The content of 2,5-dianilino-3,6-dihydroterephthalic acid ester in the reaction mixture is equivalent to 33 parts of 2,5-dianilinoterephthalic acid.

EXAMPLE 5

From 440 parts of N-methylpyrrolidone, 44 parts are distilled off at 20 mm. Hg, 47.5 parts of sodium methylate and 139 parts of diethyl succinate are then added at 40° C. and the mixture heated to 115° to 117° C. in the course of 2½ hours in a nitrogen atmosphere while stirring. At the said temperature, a current of nitrogen of 25 liters per hour is led over the reaction mixture for 7 hours. (The vapors thereby escaping are condensed as described in Example 1.) Then 288 parts of aniline are introduced in one batch into the reaction mixture and the mixture is thereby cooled to 40° C. At a maximum temperature of 50° C. there is allowed to flow in slowly a mixture of 45.9 parts of concentrated sulfuric acid and 45 parts of methanol freshly prepared at below +15° C., the mixture heated to 120° C. and kept at this temperature for another 2 hours while leading a current of nitrogen thereover. After cooling the reaction mixture to 50° C., 40 parts of water are added in small portions. The reaction material is then separated from the cooled reaction mixture as described in Example 1. 12 parts of 2,5-dianilino-3,6-dihydroterephthalic acid ester are obtained in the form of salmon colored crystals which melt between 186° and 193° C.

The actual content of dihydro ester in the reaction mixture amounts however to 13.6 parts. From this, 11.7 parts of 2,5-dianilinoterephthalic acid can be prepared in the following way:

16 parts of sulfur are introduced into the reaction mixture—without adding water—at 120° C. within 1 hour. Hydrogen sulfide thereby escapes. Then 120 parts of 40% aqueous sodium hydroxide solution are allowed to flow in at such a rate that the temperature of the mixture does not fall below 110° C. A mixture of alcohol, water and aniline is then distilled off until no further distillate passes over at a temperature of 115° C. (measured in the interior of the distillation vessel) even when a reduced pressure of 12 to 14 mm. Hg is used. After diluting the reaction mixture with 3000 parts of water, the 2,5-dianilinoterephthalic acid is separated as described in Example 1.

The same result is arrived at by using ethanolic or methanolic hydrochloric acid containing 31 parts of hydrogen chloride instead of the methanolic sulfuric acid used in the first paragraph above, or by leading 31 parts of hydrogen chloride directly into the reaction mixture.

I claim:
1. In a process for the production of a 2,5-diarylamino-3,6-dihydroterephthalic acid ester wherein a succinic acid ester is condensed with the aid of an alkali metal alcoholate in an organic solvent to the dialkali metal salt of the corresponding succinylosuccinic acid ester, and the succinylosuccinic acid ester is condensed in the presence of an acid-reacting substance with an arylamino compound to form the corresponding 2,5-diarylamino-3,6-dihydroterephthalic acid ester, the improvement which comprises: carrying out said condensation of the succinic acid ester in a carboxylic acid dialkylamide selected from the group consisting of dimethylformamide, dimethylacetamide, diethylformamide, diethylacetamide, N-methyl-2-pyrrolidone, N-ethyl-2-pyrrolidone and N-methylpiperidone as the organic solvent.

2. In a process for the production of a 2,5-diarylamino-3,6-dihydroterephthalic acid ester wherein a succinic acid ester is condensed with the aid of an alkali metal alcoholate in an organic solvent to the dialkali metal salt of the corresponding succinylosuccinic acid ester, the succinylosuccinic acid ester is set free from the dialkyl metal salt by reaction with an acid, and the succinylosuccinic acid ester is condensed in the presence of an acid catalyst with an arylamino compound selected from the group consisting of aniline, para-anisidine, para-toluidine, para-chloraniline, orthochloraniline, 2,4-dichloraniline, 2,5-dichloraniline, 3,4-dichloraniline, 3,5-dichloraniline, alpha-naphthylamine, ortho-aminobenzoic acid, meta-aminobenzoic acid and para-aminobenzoic acid to form the corresponding 2,5-diarylamino-3,6-dihydroterephthalic acid ester, the improvement which comprises: carrying out the step of condensing the succinic acid ester with the aid of an alkali metal alcoholate to form the dialkali metal salt of the corresponding succinylosuccinic acid ester, the step of liberating the free succinylosuccinic acid ester, and the reaction to form the 2,5-diarylamino-3,6-dihydroterephthalic acid ester, in a carboxylic acid dialkylamide selected from the group consisting of dimethylformamide, dimethylacetamide, diethylformamide, diethylacetamide, N-methyl-2-pyrrolidone, N-ethyl-2-pyrrolidone and N-methyl-piperidone as the organic solvent.

3. The process as claimed in claim 1 wherein N-methyl-2-pyrrolidone is used as the carboxylic acid dialkylamide.

4. The process as claimed in claim 1 wherein dimethylformamide is used as the carboxylic acid dialkylamide.

5. The process as claimed in claim 2 wherein the arylamino compound is used in an excess of 0.2 to 10 mols with respect to the succinylosuccinic acid ester.

6. The process as claimed in claim 1 wherein an inert gas is led over the reaction mixture during said condensation of the succinic acid ester.

7. The process as claimed in claim 1 wherein said condensation of the succinic acid ester is carried out under reduced pressure by applying a vacuum.

8. An improved process for the production of 2,5-diarylamino-3,6-dihydroterephthalic acid esters which comprises: condensing a lower-dialkyl ester of succinic acid with the aid of about 1 to 2 mols for each mol of said ester of a compound selected from the group consisting of the sodium and potassium alcoholates of lower alkanols at a temperature of about 50° C. to 150° C. in an organic solvent consisting essentially of a carboxylic acid dialkylamide selected from the group consisting of dimethylformamide, dimethylacetamide, diethylformamide, diethylacetamide, N-methyl-2-pyrrolidone, N-ethyl-2-pyrrolidone and N-methylpiperidone, the weight ratio of said solvent to said alcoholate being about 2.5:1 to 25:1; reacting the resulting succinylosuccinic acid ester dialkali metal salt with at least an equivalent amount of acid to liberate the free succinylosuccinic acid ester; and condensing the free ester with about 1.2 to 11 mols for each mol of free ester of an arylamino compound selected from the group consisting of aniline, para-anisidine, para-toluidine, para-chloraniline, ortho-chloraniline, 2,4-dichloraniline, 2,5-dichloraniline, 3,4-dichloraniline, 3,5-dichloraniline, alpha-naphthylamine, ortho-aminobenzoic acid, meta-aminobenzoic acid and para-aminobenzoic acid at a temperature of about 60° C. to 130° C.

9. An improved process as claimed in claim 8 wherein all steps of the claimed process are carried out in said organic solvent.

10. An improved process as claimed in claim 8 wherein the organic solvent is dimethylformamide.

11. An improved process as claimed in claim 8 wherein the organic solvent is N-methyl-2-pyrrolidone.

References Cited in the file of this patent
UNITED STATES PATENTS
2,821,541    Struve _____ Jan. 28, 1958

OTHER REFERENCES
The Condensed Chemical Dictionary, page 725, Reinhold, 1956.